(12) United States Patent
Fieldman

(10) Patent No.: US 12,288,302 B2
(45) Date of Patent: Apr. 29, 2025

(54) DISPLAY OF VIRTUAL TABLETS IN EXTENDED REALITY ENVIRONMENTS

(71) Applicant: CURIOXR, INC., Gainesville, FL (US)

(72) Inventor: Ethan Fieldman, Gainesville, FL (US)

(73) Assignee: CURIOXR, INC., Gainesville, FL (US)

( * ) Notice: Subject to any disclaimer, the term of this patent is extended or adjusted under 35 U.S.C. 154(b) by 0 days.

(21) Appl. No.: 18/764,075

(22) Filed: Jul. 3, 2024

(65) Prior Publication Data
US 2025/0078421 A1    Mar. 6, 2025

Related U.S. Application Data

(63) Continuation of application No. 18/459,941, filed on Sep. 1, 2023, now Pat. No. 12,033,293.

(51) Int. Cl.
*G06T 19/00* (2011.01)
*G06F 3/01* (2006.01)
*G06T 7/60* (2017.01)

(52) U.S. Cl.
CPC ............ *G06T 19/006* (2013.01); *G06F 3/017* (2013.01); *G06T 7/60* (2013.01); *G06T 2210/62* (2013.01)

(58) Field of Classification Search
CPC ..... G06T 19/006; G06T 7/60; G06T 2210/62; G06F 3/017
See application file for complete search history.

(56) References Cited

U.S. PATENT DOCUMENTS

| | | | |
|---|---|---|---|
| 11,631,228 B2 | 4/2023 | Fieldman | |
| 2017/0336941 A1 | 11/2017 | Gribetz | |
| 2018/0107440 A1* | 4/2018 | Knoppert | G06F 3/147 |
| 2018/0342103 A1 | 11/2018 | Schwarz et al. | |
| 2021/0248766 A1 | 8/2021 | Koo et al. | |
| 2022/0208016 A1* | 6/2022 | Le Chevalier | G06F 3/011 |

OTHER PUBLICATIONS

Dall-E/Dall-E2; retrieved on Sep. 28, 2023; 12 pages; https://openai.com/product/dall-e-2.

* cited by examiner

*Primary Examiner* — Chong Wu
(74) *Attorney, Agent, or Firm* — Polsinelli PC

(57) ABSTRACT

A method for generating a virtual tablet at a left or right position of user based on a hand gesture for creation of a virtual tablet in an extended reality environment.

20 Claims, 9 Drawing Sheets

DISPLAY OF VIRTUAL TABLETS IN EXTENDED REALITY ENVIRONMENTS

CROSS-REFERENCE TO RELATED APPLICATION

This application is a continuation of U.S. patent application Ser. No. 18/459,941, filed Sep. 1, 2023, and titled, "USE OF VIRTUAL TABLETS IN EXTENDED REALITY ENVIRONMENTS."

BACKGROUND OF THE INVENTION

Extended reality (XR) environments, i.e., environments created by immersive technologies that merge physical and virtual worlds, such as augmented reality (AR), virtual reality (VR), and mixed reality (MR) and the like, have grown more realistic and immersive as VR headsets, augmented reality devices and applications, processor speeds, data storage and data transfer technologies have continued to improve. However, unlike conventional physical reality, electronic XR environments present more opportunities for persons to collaborate and share information, including in work and education fields, in ways that are not possible in the physical constraints of the real-world.

U.S. Pat. No. 11,631,228 incorporated herein by reference in its entirety, describes using virtual tablets in XR environments. The present invention provides improved methods for creating and using such virtual tablets in various embodiments.

SUMMARY OF THE INVENTION

Embodiments of the invention provide an improved method and system for users in XR environments, including VR environments such as in the Oculus/Meta Quest platform by Oculus VR (Irvine, CA) (parent company Meta), to create and use virtual tablets.

It will be appreciated that the systems and methods, including related displays, user interfaces, controls and functionalities, disclosed herein may be similarly implemented on other XR platforms with other XR SDKs and software development tools known to XR developers.

DETAILED DESCRIPTION

Figure 1:
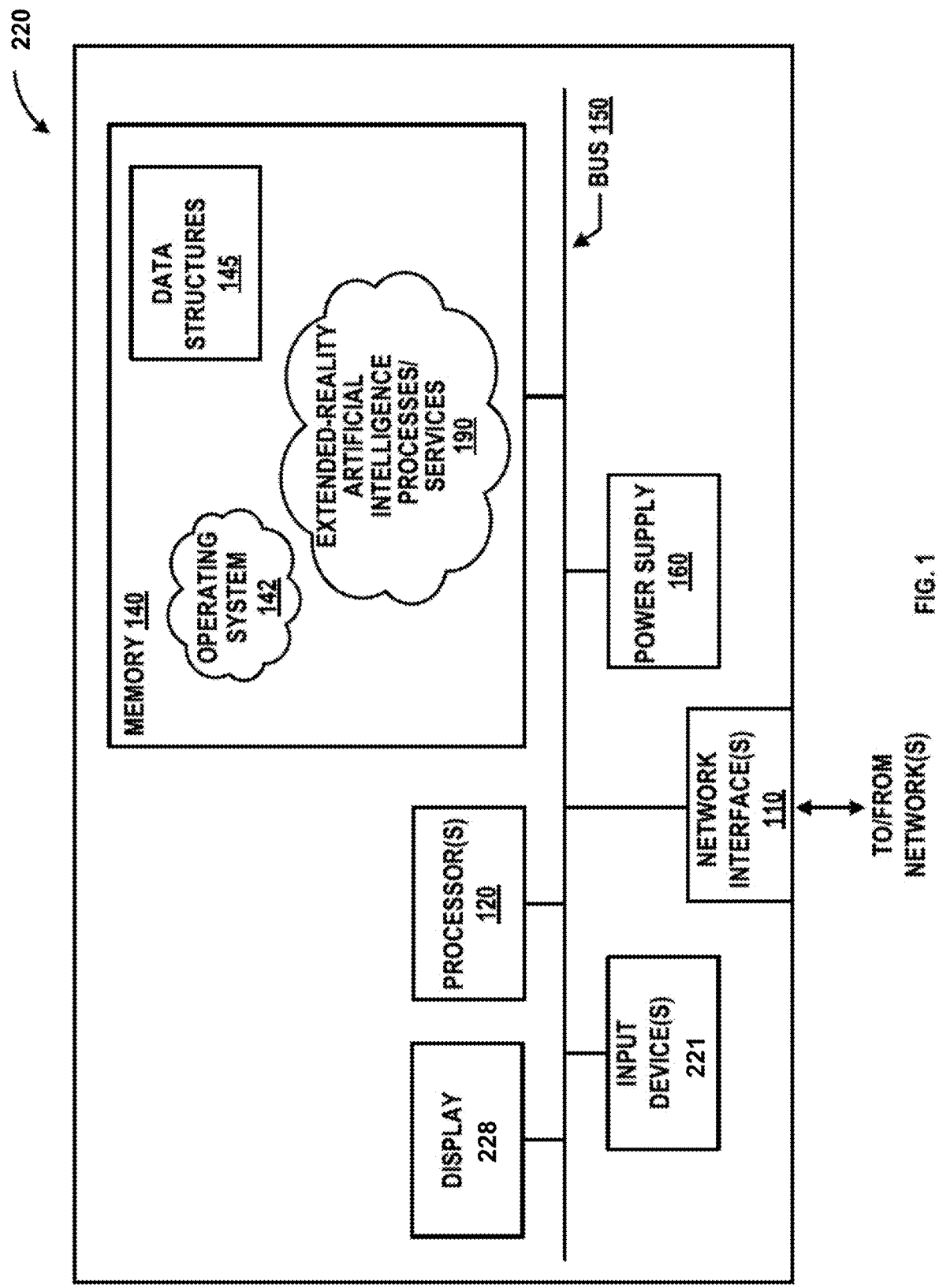
FIG. 1 is a schematic block diagram of XR device in an embodiment of the invention.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

In various embodiments, methods and systems of the invention are preferably implemented through development tools for the Oculus/Meta Quest platform (Oculus Platform SDK) by Oculus VR (Irvine, Calif.) (parent company Meta). It will be appreciated that the systems and methods, including related displays, user interfaces, controls and functionalities, disclosed herein may be similarly implemented on other VR or extended reality (XR) platforms with other VR SDKs and software development tools known to VR developers.

Computer-Implemented System

FIG. 1 is a schematic block diagram of an example XR device 220, such as wearable XR headset, that may be used with one or more embodiments described herein.

XR device 220 comprises one or more network interfaces 110 (e.g., wired, wireless, PLC, etc.), at least one processor 120, and a memory 140 interconnected by a system bus 150, as well as a power supply 160 (e.g., battery, plug-in adapter, solar power, etc.). XR device 220 can further include a display 228 for display of the XR learning environment, where display 228 can include a virtual reality display of a VR headset. Further, XR device 220 can include input device(s) 221, which can include audio input devices and orientation/inertial measurement devices. For tracking of body parts, such as hands, faces, arms and legs, held physical objects, and the like, input devices include cameras (such as integrated with an XR headset device or external cameras) and/or wearable movement tracking electronic devices, such as electronic gloves, electronic straps and bands, and other electronic wearables. XR devices of the invention may connect to one or more computing systems via wired (e.g., high speed Ethernet connection) or wireless connections (e.g., high speed wireless connections), such that computer processing, particular processing requiring significant processing and power capabilities, can be carried out remotely from the display of the XR device 220 and need not be self-contained on the XR device 220.

Network interface(s) 110 include the mechanical, electrical, and signaling circuitry for communicating data over the communication links coupled to a communication network. Network interfaces 110 are configured to transmit and/or receive data using a variety of different communication protocols. As illustrated, the box representing network interfaces 110 is shown for simplicity, and it is appreciated that such interfaces may represent different types of network connections such as wireless and wired (physical) connections. Network interfaces 110 are shown separately from power supply 160, however it is appreciated that the interfaces that support PLC protocols may communicate through power supply 160 and/or may be an integral component coupled to power supply 160.

Memory 140 includes a plurality of storage locations that are addressable by processor 120 and network interfaces 110 for storing software programs and data structures associated with the embodiments described herein. In some embodiments, XR device 220 may have limited memory or no memory (e.g., no memory for storage other than for programs/processes operating on the device and associated caches). Memory 140 can include instructions executable by the processor 120 that, when executed by the processor 120, cause the processor 120 to implement aspects of the system and the methods outlined herein.

Processor 120 comprises hardware elements or logic adapted to execute the software programs (e.g., instructions) and manipulate data structures 145. An operating system 142, portions of which are typically resident in memory 140 and executed by the processor, functionally organizes XR device 220 by, inter alia, invoking operations in support of software processes and/or services executing on the device. These software processes and/or services may include Extended Reality (XR) artificial intelligence processes/services 190, which can include methods and/or implementations of standalone processes and/or modules providing functionality described herein. While XR artificial intelligence (AI) processes/services 190 are illustrated in centralized memory 140, alternative embodiments provide for the processes/services to be operated as programmed software within the network interfaces 110, such as a component of a MAC layer, and/or as part of a distributed computing network environment.

In various embodiments AI processes/services 190 may create requested digital object images via image generating AI system, such as Dall-E or Dall-E 2 (see https://openai.com/product/dall-e-2 incorporated herein by preference) or other similar image generation systems and other synthetic media. In other embodiments, an AI process/service 190 might retrieve a requested digital object image from one or more local databases, centralized databases, cloud-based databases such as Internet databases, or decentralized databases.

Figure 2:
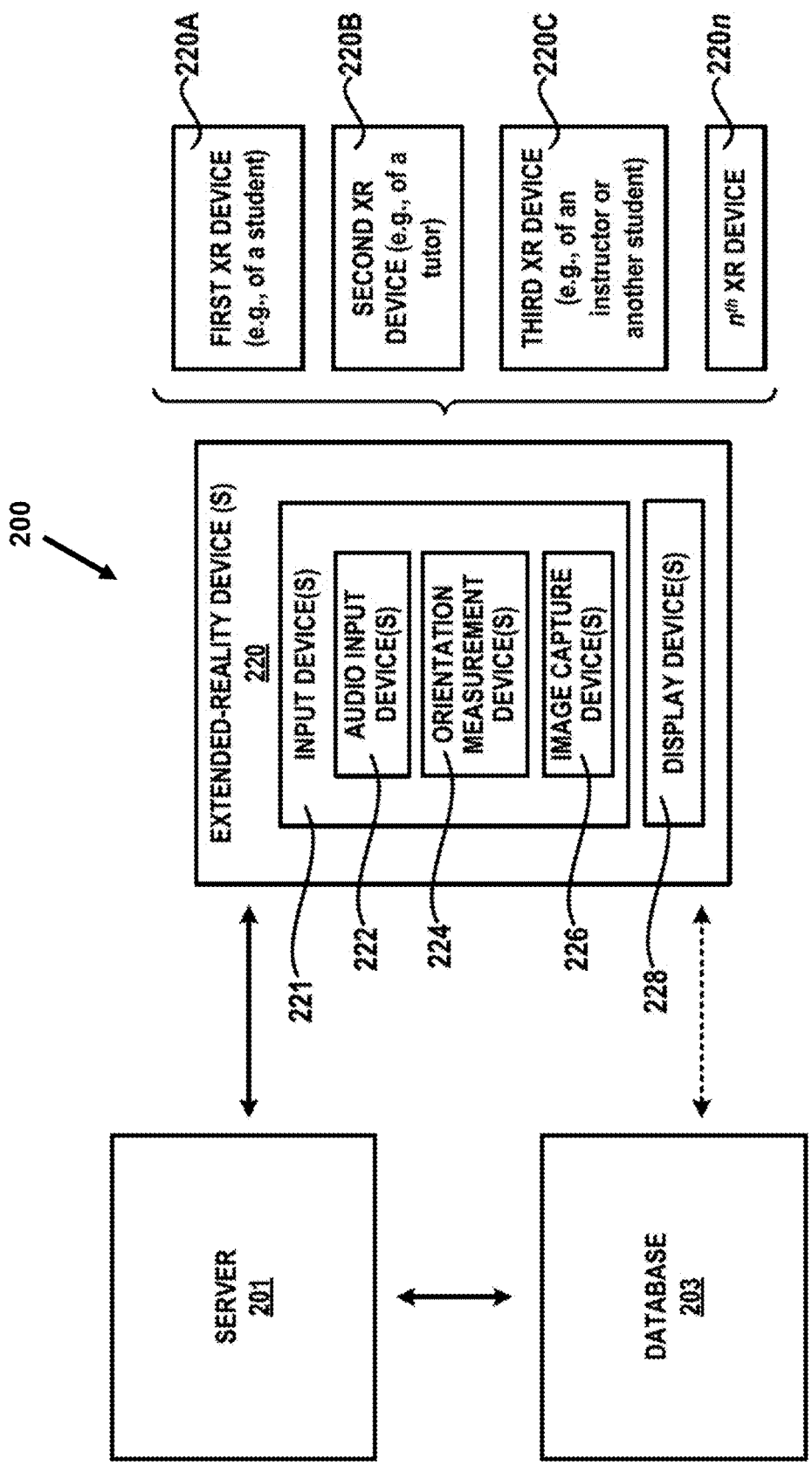
FIG. 2 is a block diagram of an XR system platform in an embodiment of the invention.

Referring to FIG. 2, an XR system (hereinafter, "system 200") for implementation of the XR learning environment, including an XR server 201 accessible by a plurality of XR devices 220 (e.g., a first XR device 220A of a first user such as a student, a second XR device 220B of a second user such as a tutor, a third XR device 220C of a third user such as an instructor . . . an nth XR device 220n belonging to another user, etc.) and another suitable computing devices with which a user can participate in the XR learning environment. The system includes a database 203 communicatively coupled to the XR server 201.

XR devices 220 includes components as input devices 221, such as audio input devices 222, orientation measurement devices 224, image capture devices 226 and XR display devices 228, such as headset display devices.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules or engines configured to operate in accordance with the techniques herein (e.g., according to the functionality of a similar process). In this context, the term module and engine may be interchangeable. In general, the term module or engine refers to model or an organization of interrelated software components/functions.

Generating Virtual Tablets in XR Environment

In embodiments of the invention, a user triggering creation of virtual tablet in a XR environment typically wants the tablet at comfortable reaching and interaction distance the XR environment.

Figure 3:
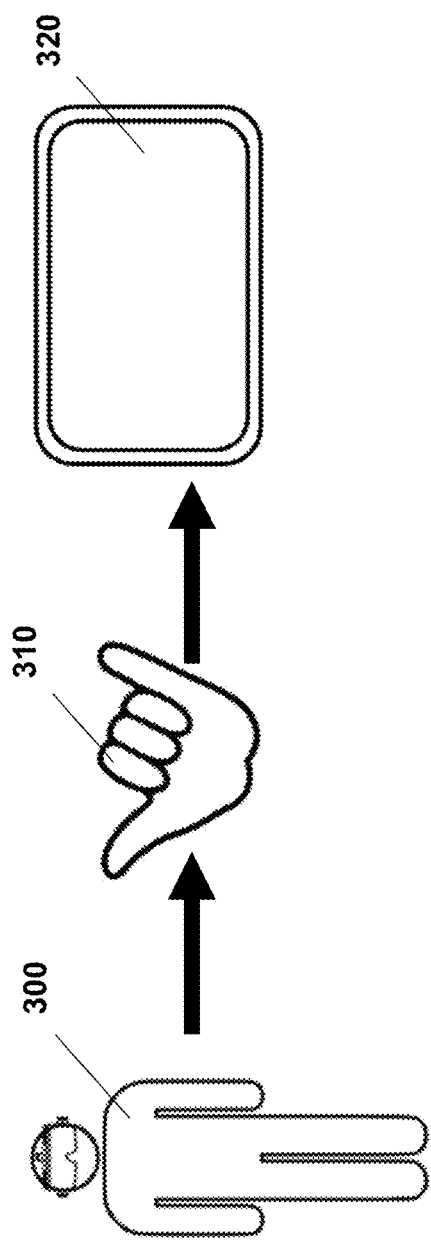
FIG. 3 is a schematic diagram illustrating a user with a XR device that makes a hand gesture and spawning of virtual tablet in an XR environment in response to the hand gesture in an embodiment of the invention.

Referring to FIG. 3, a user 300 in an XR environment uses a hand gesture 310, such as the 'shaka' hand gesture shown, to spawn a virtual tablet 320 which permit the user to control and interact with the XR environment using hand interactions with a virtual screen of the virtual tablet, including through buttons and sliders appearing on the tablet screen.

Software of the XR system can query any part of the hand, or the hands and determine location information. The results of the location of the hands are in a Vector3. A Vector3(x,y,z) function is part of the Unity™ coordinate system delivering a point in space relative to the global position of the scene or "global" position in an XR environment.

Figure 4:
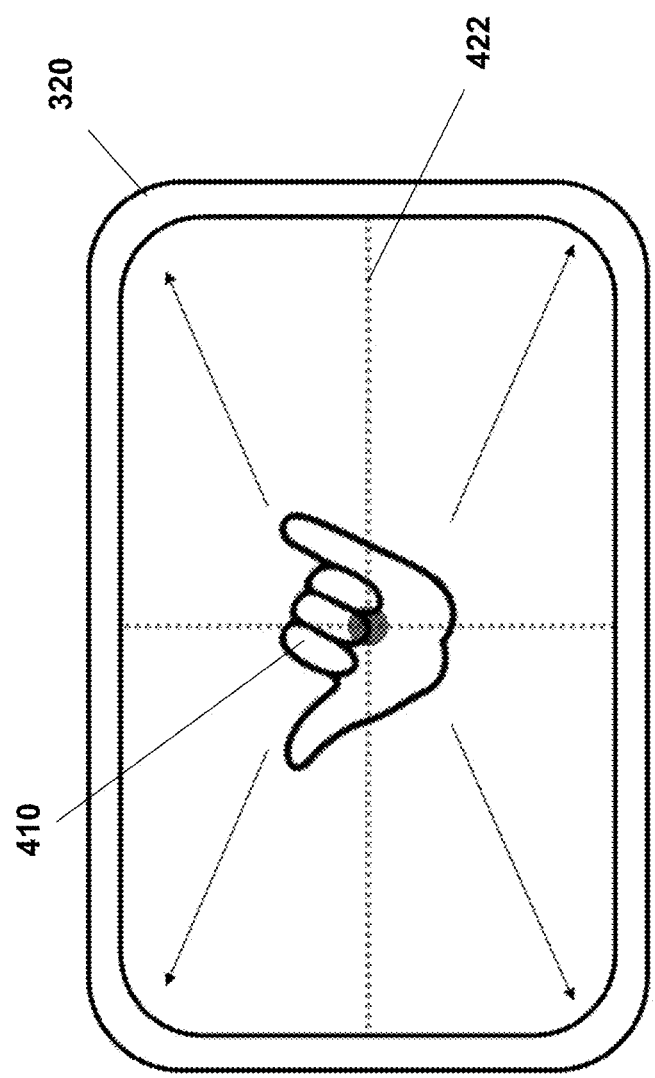
FIG. 4 is schematic diagram illustrating a spawned virtual tablet being centered on x and y coordinates relative to a user's hand in an XR environment in an embodiment of the invention.

Referring to FIG. 4, when the hand gesture 310 is performed, for the X and Y coordinate plane (left/right and up/down) the virtual tablet 320 spawns in in the center of the hand 410 at the intersection of the dashed lines 422, so that the user can easily access all corners of the tablet 320. 'Shaka' sign can be performed with palm facing user, or facing away from user with the same affect regardless of which way the gesture is facing. Tablet 320 always spawns in center of hand (X & Y coordinates). Using the coordinates of the center of the hand from the Vector3(x,y,z) function, the tablet can be spawned in at the same X, Y coordinates so that it is spawned in the center of the user's hand. Tablet stays in position when spawned, unless moved by user after the tablet spawns.

Figure 5:
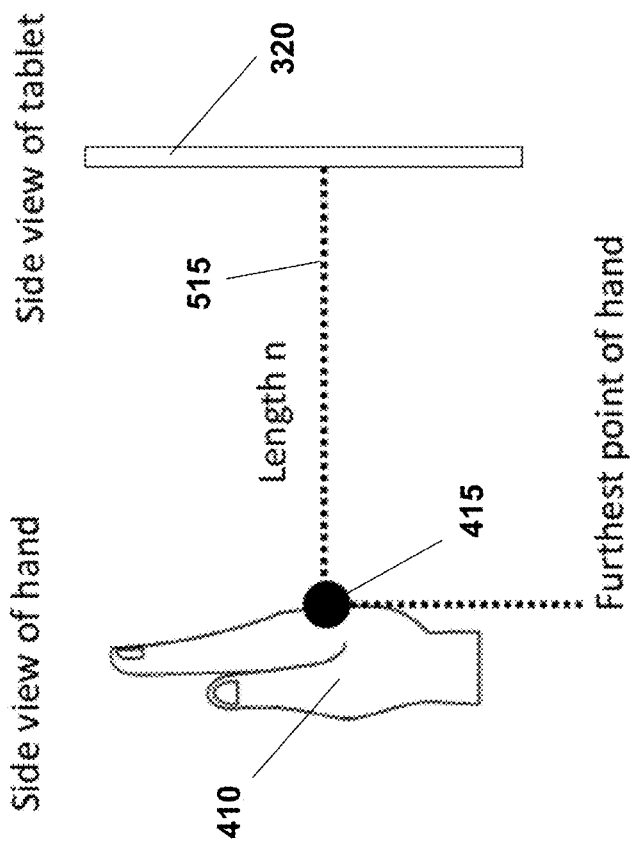
FIG. 5 is schematic diagram illustrating positioning of spawned virtual tablet on z coordinate relative to a user's hand in an XR environment in an embodiment of the invention.

Referring to FIG. 5, when the hand gesture is performed, the Z coordinate of the virtual tablet's spawn location is calculated using the coordinates of the farthest-forward part 415 of the hand 410 from the Vector3(x,y,z) function, plus additional buffer space as length "n" 515. The additional buffer space "n" 515 is needed so that after the user triggers spawning the tablet 320, there is space, i.e., length "n" 515, between the tablet 320 and the user's hand 410 to interact with the tablet 320 by tapping it or pressing a button on the tablet. Combining the X and Y coordinates generated from the center of the hand, the tablet should spawn in at position (x,y,z+n) corresponding to 3-dimensional location comfortably in front of the center of the user's hand (x,y,z). In embodiments of the invention, it will be appreciated that buffer length "n" 515 is typically from an inch to several inches, such as from about 1-5 inches, and more preferably about 2 inches, which may also vary depending on the hand and finger characteristics of user, including the XR system calculating the "n" distance from the size of user's hand and/or a finger length.

Figure 6:
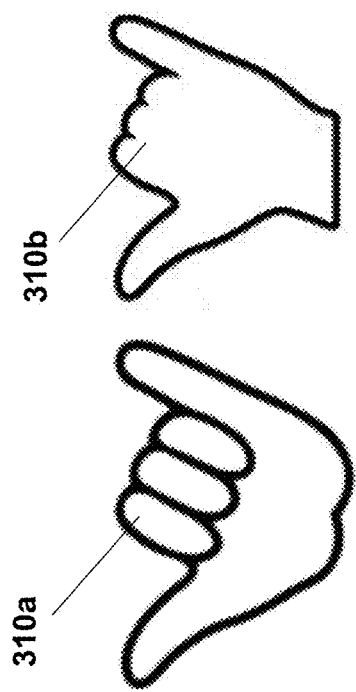
FIG. 6 is schematic diagram illustrating alternative hand gestures facing forward and backward while providing the same virtual tablet creation trigger in a XR environment in an embodiment of the invention.

As shown in FIG. 6, hand gesture 310 'shaka' sign can be performed with palm of hand facing the user as shown by gesture 310a or facing away from the user as shown by gesture 310b. The direction of the hand gesture does not change anything in terms of generating the tablet 320 and/or the position of the tablet 320.

Figure 7:
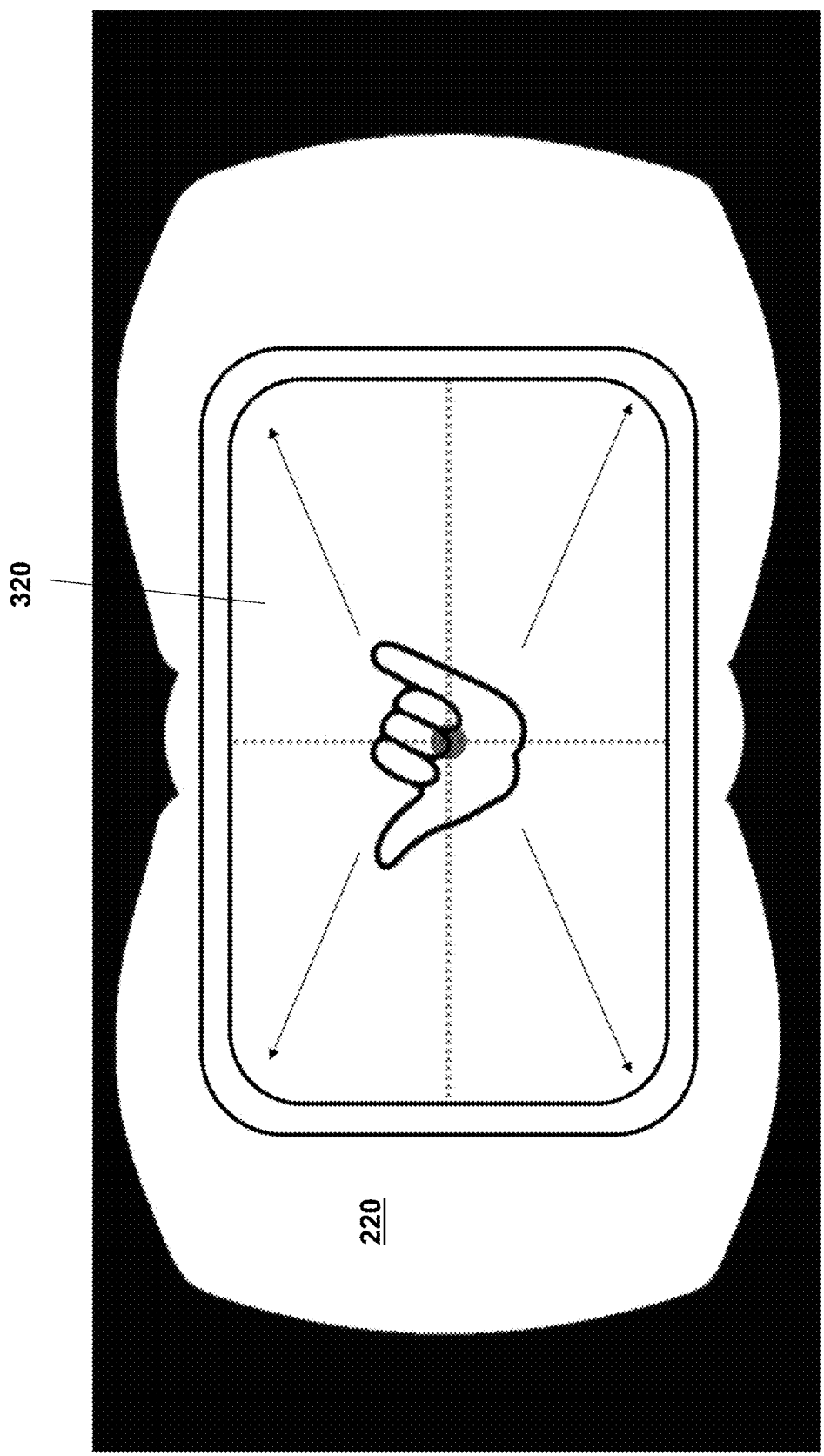
FIG. 7 is schematic diagram from a user's perspective that is wearing am XR device and illustrates a spawned virtual tablet that is generated with the screen of the tablet facing the user in the XR environment in an embodiment of the invention.

Referring to FIG. 7, a view of the spawned virtual tablet is shown for the point of view of our user wearing an XR headset to generate the tablet 320. Preferably tablet 320 spawns oriented facing the user's eyes. In embodiments, the orientation of the user's hand while performing the hand gesture does not determine how the tablet spawns.

Figure 8:
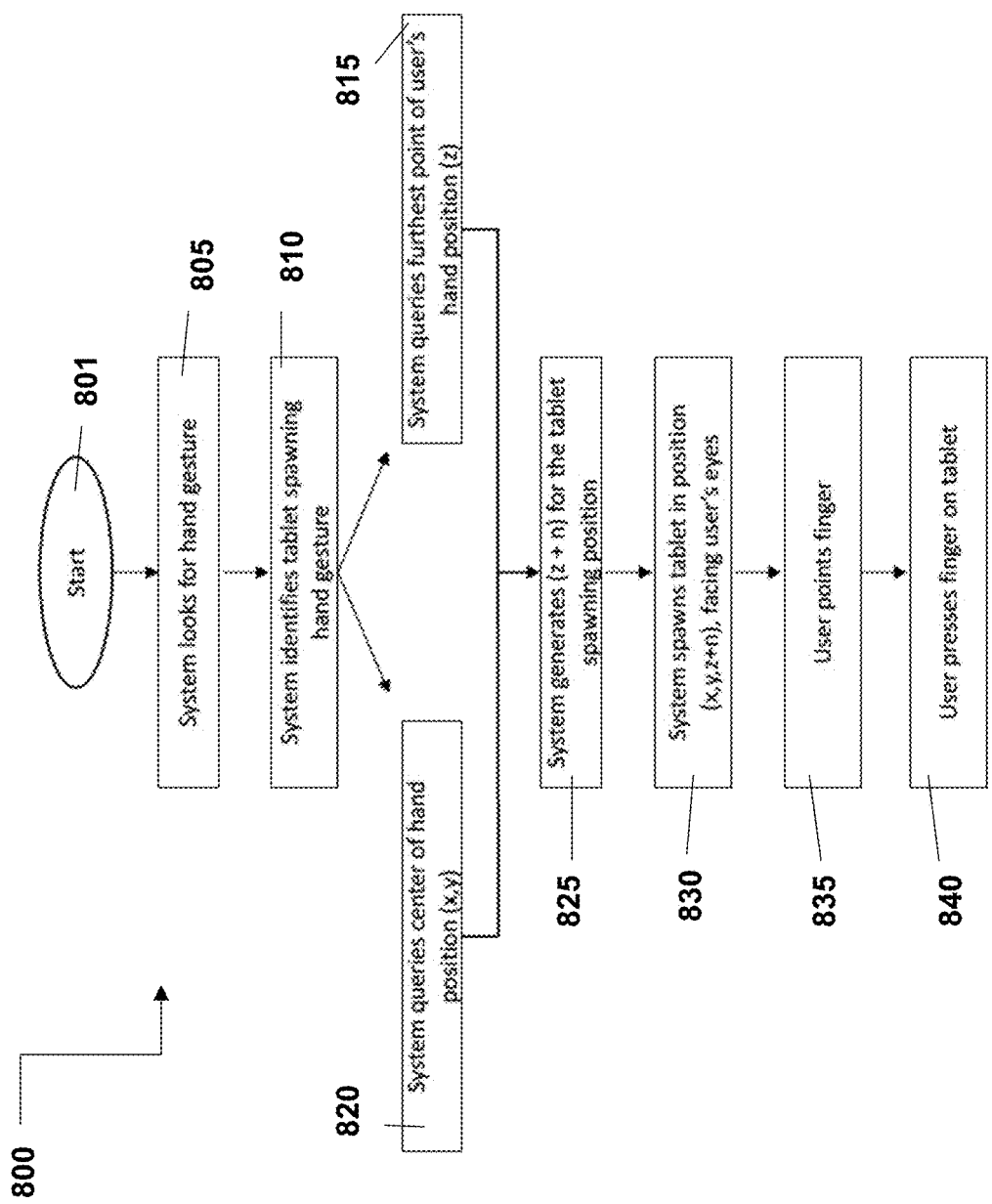
FIG. 8 is a flow diagram illustrating a method for spawning a virtual tablet in an XR environment in an embodiment of the invention.

Referring to FIG. 8, a flow diagram illustrates a method 800 for generating a virtual tablet at a comfortable distance from a user's hand and finger in an XR environment in an embodiment of the invention. The method starts at step 801 and the XR system is monitoring for a hand gesture to trigger creation of a virtual tablet at step 805. At step 810, the XR system detects the tablet-spawning request gesture. The XR system determines at step 815 the furthest point of a user's hand away from the user relative to the point of view position of the user, i.e., coordinates of the user's position, in the XR environment on the Z-axis. At 820, the XR system determines where to center the tablet relative to the user's hand on X and Y axes. At step 825, the XR system determines the z-coordinates for tablet generation based on the further point coordinates of the user's hand plus additional buffer spacing "n"-distance that accounts for a comfortable distance for the user to extend their fingers and/or hand to use the spawned tablet. At step 830, the virtual tablet is generated relative to the user's hand at the determined coordinates (x, y, z+n) and with the virtual screen of the virtual tablet facing the user in XR environment. At step 835 the user points or extends finger toward the table screen to interact with the tablet. At step 840 the user virtual touches the tablet screen to interact with the tablet.

In some embodiments, virtual tablets may include transparency settings that are adjustable by a user or automatically change based on the XR environment that is present with the virtual tablet and user, including if other objects and scenery of the XR environment are underlying the virtual tablet.

Supplemental/Complementary Virtual Sub-Tablets

In embodiments of the invention, a virtual sub-tablet can extend out of a primary virtual tablet to provide related tools or interactive functions where the primary tablet does not have enough space on the primary tablet. It will be appreciated that while extending of sub-tablet is described as sliding or extending out a primary tablet, that a sub-tablet associated with a primary tablet could be generated or spawned near the primary tablet through a variety of animations or appearance mechanisms. It will be appreciated that a sub-tablet can be retracted back into the primary tablet or similarly dismissed when the user is done using the sub-tablet.

Figure 9:
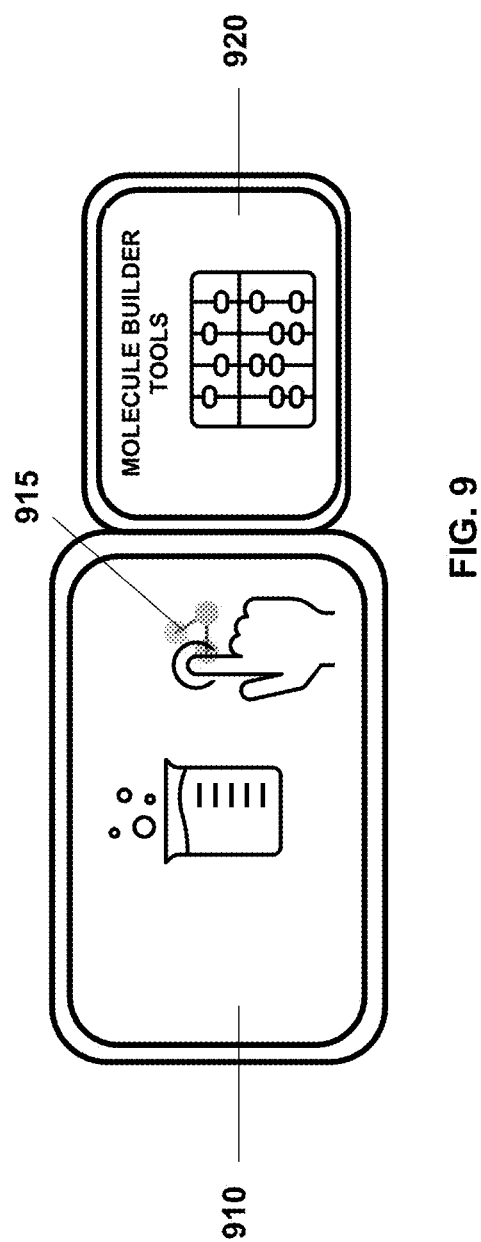
FIG. 9 is a schematic diagram illustrating a virtual sub-tablet extended from a virtual primary tablet in an embodiment of the present invention.

Referring to FIG. 9, an example is shown of a primary virtual tablet 910 displaying chemistry class related information, applications, and the like to a user in an extended reality environment. The user could point to or touch a "Molecule Builder" button 915 on the virtual tablet that triggers a sub-tablet, complementary tablet, secondary tablet, "tools" tablet, or similar supplemental tablet 920 to extend out from the primary virtual tablet 910.

In some embodiments, the sub-tablet 920 slides out and next to the primary tablet 910 on the same plane. In such embodiments, the extension on the same plane in the XR environment more easily allows the user to move their hand and arm over along the same plane to interact with the sub-tablet.

In some embodiments, the sub-tablet 920 can alternatively instead slide out on the same plane as the primary tablet 910, but the sub-tablet could be slightly angled or even curved toward the user in the XR environment versus the main tablet. Like a monitor that is angled or curved, displayed information on the angled (curved) sub-tablet is closer to a person's face (hand for sub-tablet in an XR environment) as it gets bigger. In such embodiments, a user has to move their hand and arms as little as possible to interact with the sub-tablet.

In embodiments, a sub-tablet sliding out includes content that is specific or related to the activities or subject matter use of the main tablet. Math tools, such as different calculators or graphs and the like can extend out on sub-tablets of a primary "Math" tablet, writing tools could be provided on sub-tablet for an English or language class, and the like.

In further embodiments multiple sub-tablets could extend from a primary tablet providing multiple sets of tools or different functions related to the primary tablet activities. In other embodiments, sub-tablets could also have additional child tablets that extend out from each sub-tablet so that there could be n-number of sub-tablets providing more specific types of tools and interactivities. In embodiments, each progressive child tablet from a preceding sub-tablet may be presented as slightly smaller in size than the preceding tablet so that each sub-level of the respective sub-tablet is able to be quickly discerned by the user. In other embodiments, each progressive child sub-tablet might also be presented with different appearance indicators, such as visible numbers, different colors, different shapes, different transparency levels and the like. In some embodiments, multiple sub-tablets or child tablets may be stacked upon one another to conserve space in the XR environment and might include virtual tabs for a user to select a child tablet from the stack. In some embodiment a stacking of sub-tablets might also be able to be slid in different directions and to different locations by the user in the XR environment. In further embodiments, stacked child tablets could be organized to be rotatable so that a user could rotate the stacked tablets like a wheel (e.g., Rolodex™) to choose sub-tablet that the user would like to use. In a further embodiment, multiple sub-tablets (and even the primary tablet) could be minimized (similar to open windows on a PC) so that a sub-tablet is minimized out of view in the XR environment, but a visual indicator can remain for a user to re-open the sub-tablet when desired.

In embodiments of the invention, the sub-tablet will extend from the primary tablet based on which hand is used to tap on the virtual tablet. In still further embodiments, the interactivity of a particular application or function of a virtual tablet can also be dependent on which hand is used for tapping, clicking or interacting with a tablet.

In one example, if a user uses their left hand to tap on a main tablet to initiate a tools tablet to extend or slide out of the main tablet, then the tools sub-tablet slides out to the user's right. And if the user taps the main tablet with their right hand, then the sub-tablet slides out to the user's left. The action of the tablet is therefore based on which hand the user is using. In other embodiments, similar left vs. right hand or tapping use can cause a different result or activity depending on the hand used to initiate from an application that is tapped in a XR environment.

In other embodiments, a user may provide a preference in a settings profile to direct what side of a primary tablet a sub-tablet should extend from or similar settings of left vs. right activity results. In further embodiments, the XR system could prompt—such as visually or audibly—the user to specify how they would like a sub-tablet to extend from a primary tablet. In various embodiments, a sub-tablet might also extend from a top or bottom of primary tablet instead of the left or right side.

In various embodiment, if a user uses their left hand to make a primary tablet request gesture (e.g., a Shaka sign), the main tablet will appear to the left side of that user's body in the XR environment since their left hand was used to make the gesture and will be on the left side of their body. It is convenient to the user that a sub-tablet, e.g., specific tools tablet associated with the subject matter of the main tablet, slide outs of the right side of the main tablet and toward the middle of the user's body so that it is nearer the user for use as compared to if it extended further out to the left side of the user's body. Additionally, since the user's eyes are in the center of the user's body the sub-tablet extend toward the middle of the user's body provides a better viewing angle than if the sub-tablet extending further out to the left at a high and difficult angle to even see the sub-tablet.

In one embodiment, if user taps on the primary tablet and that main tablet is to the left of the user's belly button position (i.e. central point of the user's body facing toward the extended reality environment), then a sub-tablet (or anything else that might extend out of the primary virtual tablet) preferably should extend towards the center of the user's body (belly button) as opposed to away from the belly button (and nose and eyes). This sub-tablet extension toward the center of a user's body would be vice-versa if the primary tablet were to the right of the user's belly button position.

In further embodiments of the invention, it will be appreciated that virtual tablets, such a virtual primary tablet, is not limited to being rectangular and mimicking conventional computing tablets (like an iPad™). In alternative embodiments, other shapes with tablet-like virtual display screens could be provided such as polygons, e.g., cube, pyramid, and the like for a user to interact with a screen of such polygon including the possibility for multiple virtual screens on different sides of the polygon-shaped virtual tablet. In such embodiments, sub-tablets (e.g., tool tablets) could be extended from any of a number of sides and screens of a polygon-type tablet and different screens and associated sub-tablets could have different types of functions and sub-functions available to the user to interact with the XR environment.

It should be understood from the foregoing that, while embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A method for generating a virtual tablet in an extended reality environment comprising:
   displaying on a display of an extended reality device of a user an extended reality environment;
   detecting a hand gesture from a hand of the user and identifying the hand gesture as a request for a virtual tablet in the extended reality environment;
   determining if the hand gesture was made by a left hand or a right hand of the user; and
   displaying the virtual tablet to the user on the left side from center of the user's body if the hand gesture was determined made by the left hand and on the right side from center of the user's body if the hand gesture was determined made by the right hand.

2. The method of claim 1, further comprising displaying the virtual tablet a predetermined distance from the hand of the user from which the hand gesture was detected.

3. The method of claim 2, further comprising displaying a virtual sub-tablet that extends out from the virtual tablet toward a position in front of the center of the user's body.

4. The method of claim 3, wherein the sub-tablet displays an interactive interface of tools associated with the subject matter displayed on the virtual tablet.

5. The method of claim 3, wherein the sub-tablet displays an interactive interface of tools operable to provide functions for activities displayed on the virtual tablet.

6. The method of claim 1, further comprising displaying the virtual tablet a calculated distance from the hand of the user from which the hand gesture was detected based on a size of the user's hand that made the gesture.

7. The method of claim 6, further comprising displaying a virtual sub-tablet that extends out from the virtual tablet toward a position in front of the center of the user's body.

8. The method of claim 1, wherein the virtual tablet includes an adjustable transparency level.

9. The method of claim 8, wherein the virtual tablet is initially displayed with a transparency level determined from one or more virtual objects that are positioned to underlie the virtual tablet.

10. The method of claim 9, further comprising displaying a virtual sub-tablet that extends out from the virtual tablet toward a position in front of the center of the user's body.

11. The method of claim 8, further comprising displaying a virtual sub-tablet that extends out from the virtual tablet toward a position in front of the center of the user's body.

12. The method of claim 1, wherein the virtual tablet is displayed with a transparency level determined from one or more virtual objects that are positioned to underlie the virtual tablet.

13. The method of claim 12, further comprising displaying a virtual sub-tablet that extends out from the virtual tablet toward a position in front of the center of the user's body.

14. The method of claim 1, further comprising displaying a virtual sub-tablet that extends out from the virtual tablet toward a position in front of the center of the user's body.

15. A system, comprising:
a processor in communication with a memory, the memory including instructions executable by the processor to:
display on a display of an extended reality device of a user an extended reality environment;
detect a hand gesture from a hand of the user and identifying the hand gesture as a request for a virtual tablet in the extended reality environment;
determine if the hand gesture was made by a left hand or a right hand of the user; and
display the virtual tablet to the user on the left side from center of the user's body if the hand gesture was determined made by the left hand and on the right side from center of the user's body if the hand gesture was determined made by the right hand.

16. The system of claim 15, wherein the memory further includes instructions executable by the processor to display the virtual tablet having an adjustable transparency level.

17. The system of claim 15, wherein the memory further includes instructions executable by the processor to display the virtual tablet having a transparency level determined from one or more virtual objects that are positioned to underlie the virtual tablet.

18. The system of claim 15, wherein the memory further includes instructions executable by the processor to display a virtual sub-tablet that extends out from the virtual tablet toward a position in front of the center of the user's body.

19. The system of claim 15, wherein the memory further includes instructions executable by the processor to display a virtual sub-tablet that extends out from the virtual tablet and includes an interactive interface of tools associated with the subject matter displayed on the virtual tablet.

20. The system of claim 15, wherein the memory further includes instructions executable by the processor to display a virtual sub-tablet that extends out from the virtual tablet and includes an interactive interface of tools operable to provide functions for activities displayed on the virtual tablet.

\* \* \* \* \*